United States Patent [19]
Wallrafen

[11] Patent Number: 5,979,217
[45] Date of Patent: Nov. 9, 1999

[54] DEVICE FOR DISPLAYING CHANGE OF BAROMETRIC AIR PRESSURE

[75] Inventor: Werner Wallrafen, Cimbernstrasse 2, 65719 Hofheim, Germany

[73] Assignee: Werner Wallrafen, Hofheim, Germany

[21] Appl. No.: 09/088,841

[22] Filed: Jun. 2, 1998

[51] Int. Cl.⁶ .................................................. G01L 27/00
[52] U.S. Cl. ............................................................. 73/1.59
[58] Field of Search .................................... 73/1.59, 1.66, 73/712, 174, 723; 364/528.36, 468.15, 468.24

[56] References Cited

FOREIGN PATENT DOCUMENTS 3431130  3/1986  Germany .
4310060  9/1993  Germany .

OTHER PUBLICATIONS

Siemens, Schaltbeispiele, Ausgabe 1982/83 (direkte Nachfolge der letzten Ausgabe 1980/81) (No month).

*Primary Examiner*—William Oen
*Attorney, Agent, or Firm*—Mayer, Brown & Platt

[57] ABSTRACT

The invention is a device for representing changes in barometric pressure comprising an electronic barometric pressure sensor 2 and a digital differentiating circuit in which a differential quotient $\Delta P/\Delta t$ is found which is connected to a display of the speed of the change in barometric pressure with mathematical sign and numerical figure. The electrical supply for said barometric pressure sensor 2 is obtained in cyclical intervals. The cyclically determined measured barometric pressure values are checked for plausibility, only the plausible measured barometric pressure values being used to find the differential quotient $\Delta P/\Delta t$.

29 Claims, 6 Drawing Sheets

DEVICE FOR DISPLAYING CHANGE OF BAROMETRIC AIR PRESSURE

FIELD OF THE INVENTION

The invention is a device for representing changes in barometric pressure comprising an electronic barometric pressure sensor and a digital differentiating circuit in which a differential quotient $\Delta P/\Delta t$ is found which is connected to a display of the speed of the change in barometric pressure with mathematical sign and numerical figure.

BACKGROUND OF THE INVENTION

Known from DE-PS 34 31 130 is a device of the aforesaid type that displays a speed of change in barometric pressure in terms of a numerical figure and direction. However, this device does not make independent stand-alone battery operation possible. High permanent current consumption is disadvantageous in an analog display comprising a magnetic coil measuring element. Furthermore, the pressure sensor also requires a lot of current. This makes it impossible to have continuous operations using battery-supplied power for several months.

The object of the invention is therefore to create a device of the aforesaid type that makes possible battery operation over several months.

SUMMARY OF THE INVENTION

This object is solved in accordance with the invention in that the electrical supply for the barometric pressure sensor is obtained in cyclical intervals and in that the cyclically determined measured barometric pressure values are checked for plausibility, only the plausible measured barometric pressure values being used to find the differential quotients $\Delta P/\Delta t$.

A further solution to the object occurs in that the electrical supply for the barometric pressure sensor is obtained in cyclical intervals, in that the differential quotients $\Delta P/\Delta t$ are found from the cyclically determined measured barometric pressure values, and the differential quotients $\Delta P/\Delta t$ are checked for plausibility, only the plausible differential quotients being used to actuate the display.

It is obvious that the contents for the display of the speed of change in barometric pressure can be displayed in any manner or form of representation. For example, representation of mathematical sign and numerical figure for opto-electronic displays can merely be arrow symbols with or without scale or numbering.

This device makes possible stand-alone wireless battery operation over longer periods of time as well as more cost-effective manufacture of the device. An additional advantage of the switched power supply for the barometric pressure sensor is that the sensor cannot heat up much in the short operating time and therefore only a minor error in measurement caused by self-heating is possible.

During start-up, in order for the device to prevent the measured barometric pressure value measured at that time from being incorrect, and therefore to prevent the display of the speed of change in barometric pressure from being incorrect, at least three measured barometric pressure values can be taken at a pre-determined interval and these can be stored temporarily in a memory.

Plausibility can be determined by atypically large deviations in individual barometric pressure measurements from an average value for barometric pressure measurements or atypically large deviations of individual differential quotients from an average value for the differential quotients formed from a time window specified in advance. In this way meteorologically atypically large deviations from the average value of a given series of pressure measurements are determined (which occur, e.g., as a result of pulse-shape pressure waves when a door is shut in a house). Given high sensitivity or resolution of under 0.1 hPa/h it is very important to suppress even small disturbances through implausible measurements. For instance, a 1 hPa increase in 0.5 seconds means a speed of change in barometric pressure of 7200 hPa/h.

The intervals between barometric pressure sensor reading times are between about one and ten minutes.

The change in barometric pressure is also very rapid in the case of sudden storms or hurricanes. Taking a reading with the barometric pressure sensor about every ten to twenty minutes would only be sufficient for a rough barograph display, as is common with a bar chart. A shorter reading interval is very important for a display of change in barometric pressure, especially for sudden stormy weather changes. It is therefore highly advantageous if the interval between reading times for barometric pressure sensor values is between about 0.5 and 5 minutes.

If the current differential quotient $\Delta P/\Delta t$ or the average value of the current plausible differential quotients $\Delta P/\Delta t$ is forwarded to the display via a digital low-pass filter, in which preferably the time constant of the digital low-pass filter is between about 0.1 hour and ten hours, changes in barometric pressure that occurred earlier in time are included in the evaluation. The weight of these previous changes in barometric pressure on the display, however, decreases the further back in time the measured values occurred.

This natural damping algorithm is advantageous for synoptic meteorology because all changes in barometric pressure that occurred more than two to three hours in the past lose importance in terms of forecasting. In addition, the damped display is advantageous with respect to short-term fluctuations, which are less relevant to observing trends.

In an advantageous embodiment, the display is a flat display, like an electro-optical display, which can especially constitute a liquid crystal display. Such flat displays are cost-effective and require little energy so that power supply from a battery over a long period is possible.

Preferably the liquid crystal display can display at least five arrow symbols that can be actuated independent of the determined change in pressure, the arrow symbols being arranged in a series, each arrow being assigned a particular value of a change in barometric pressure and the orientation of the arrow symbol for a zero change in barometric pressure being approximately horizontal. The representations on flat displays make it possible to design the display in many different ways. For instance the series of arrows and the scale, if any, can be in a relatively circular shape, in a relatively oval shape, in a semi-circle, or even in a line. Given a relatively semi-circular arrangement of the arrows on only half of the flat display, there is still enough free area left available for other climatic data. Preferably temperatures or relative humidity values can be displayed on the second half of the flat display. The display for temperature and relative humidity are coupled with neighboring trend arrows in a further useful embodiment associated with displaying barometric pressure trends. This way all of the climatic information displayed on the flat display is shown with statements about trends.

To further save display surface area, in one embodiment the scale is placed on the device housing rather than on the flat display. Likewise, associated figures are placed next to the scale on the housing in order to save space. These measures further reduce manufacturing costs, as well.

The scaling can comprise non-linear division of the speed of change in barometric pressure on a display dial. The scaling can comprise a different scaling—that is divided by section—of the speed of change in barometric pressure on the display dial.

If the scale in the section for zero speed of change in barometric pressure is expanded in comparison to the final range of the scale, this makes it possible that on the one hand large measured values can be displayed while on the other hand the smallest changes, but changes that are still important, around the 0 hPa/h section can be displayed without having to use an excessive number of arrows.

The indicating range for the speed of change in barometric pressure is preferably essentially between −5 hPa/h and +5 hPa/h. This means that in addition to the usual mean speeds ranging between −3 hPa/h and +3 hPa/h, peak values up to −5 hPa/h and +5 hPa/h are covered.

In a simple embodiment the barometric pressure sensor can be a capacitive barometric pressure sensor that can be manufactured micro-mechanically. Preferably this capacitive sensor can convert the barometric pressure value directly into a frequency-to-analog rectangular signal that can be evaluated directly by a microcomputer. This means that there is no need to use an expensive high-resolution analog/digital transducer. This is advantageous just in terms of required high resolution (e.g., 15 bit).

In another simple embodiment, the barometric pressure sensor can also comprise an inexpensive piezo-resistive barometric pressure sensor and a doped semi-conductor.

If the display comprises an indicator that is actuatable by a step motor, especially an indicator that is can be driven by a step motor via gears, this leads to energy savings because electrical energy is only required when there is a change in the display value. The step motor is preferably a two-phase step motor having pulse drive for both directions of rotation.

In a display controlled by a step motor, the information about indicator position can be lost whenever there is an interruption in the power supply (e.g., when the battery is being changed). In an advantageous embodiment it is provided that upon start-up the indicator in the display is first steered to a defined reference point and then is guided to the display value by means of counting up and down incrementally. In a simple embodiment, this reference point comprises an indicator stop. The indicator is guided incrementally to the display value from this position.

In a battery that is becoming weaker there is the problem of a display freezing up so that it is not readily apparent whether the problem is a measured value that is not changing or a dead battery. Thus, in a further embodiment it is provided that the indicator, prior to dropping below the smallest permissible operating voltage, is guided to a warning position outside the indicating range and remains there. It is useful to label this position with a battery symbol.

An optical warning display can be actuatable when the speed of change in barometric pressure drops below a pre-determined negative value. Furthermore, an acoustic alarm can be initiated when the speed of the change in barometric pressure drops below a pre-determined negative threshold value. This threshold value can be identical to the limiting value, but does not have to be. In addition, the optical warning display (storm symbol) can be actuated to blink upon reaching the threshold value.

An additional variable that can be represented on the display is the absolute atmospheric pressure.

Exemplary embodiments of the invention are shown in the drawings and described in greater detail in the following.

DETAILED DESCRIPTION OF THE PREFERRED EMBODIMENT

Figure 1:
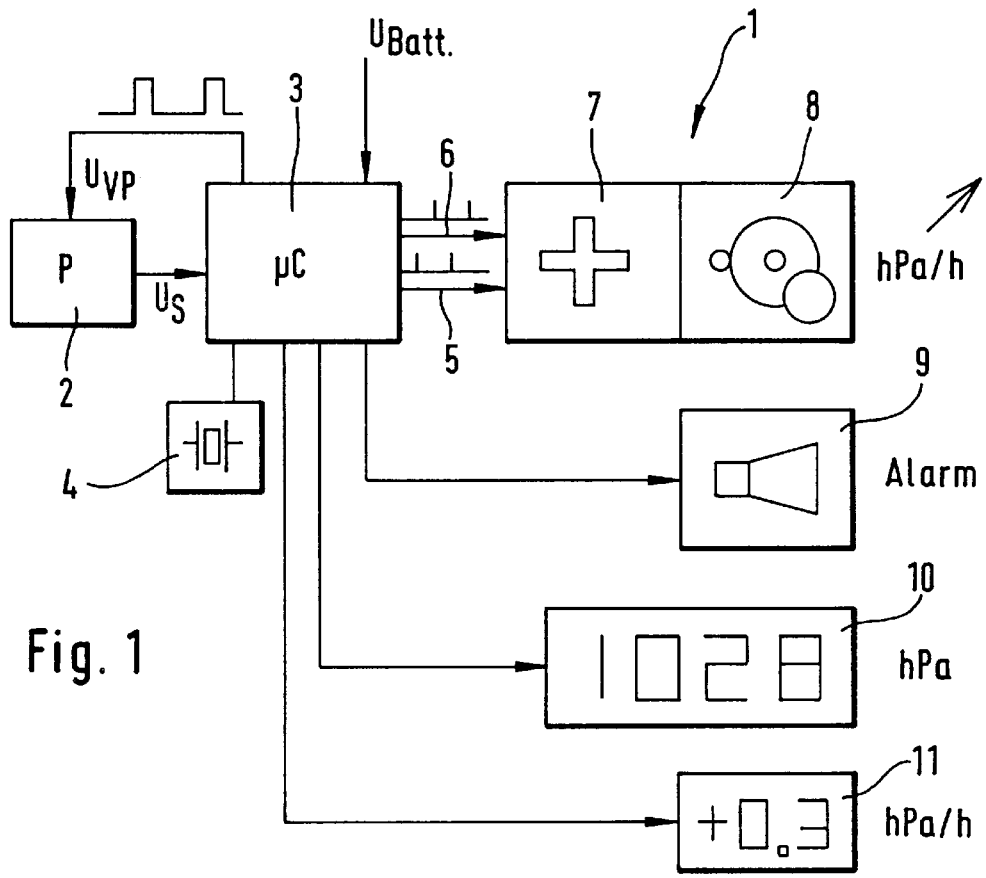
FIG. 1 is a device for representing changes in barometric pressure comprising a switching arrangement, a barometric pressure sensor, a microcomputer, and warning and display components.

FIG. 1 illustrates a switching arrangement 1 for detecting, evaluating, and displaying the speed of change in barometric pressure with numerical figure and mathematical sign. The switching arrangement 1 comprises a barometric pressure sensor 2 for detecting the atmospheric pressure P. The barometric pressure sensor 2 is supplied electrical power by means of a clocked function $U_{-VP}(t)$, which is controlled by a single-chip microcomputer 3. The clocked electrical supply is provided for supplying voltage and for supplying constant current. A quartz or resonator 4 that is directly connected to the microcomputer 3 generates the time base for the control and the time-related evaluation. During the supply phases of the barometric sensor 2, the microcomputer 3 takes the current barometric pressure sensor value $U_S(t)$ and stores it temporarily. The barometric pressure sensor value $U_S(t)$ can be present in the form of an analog voltage as frequency, period, or pulse-width modulation.

Figure 2:
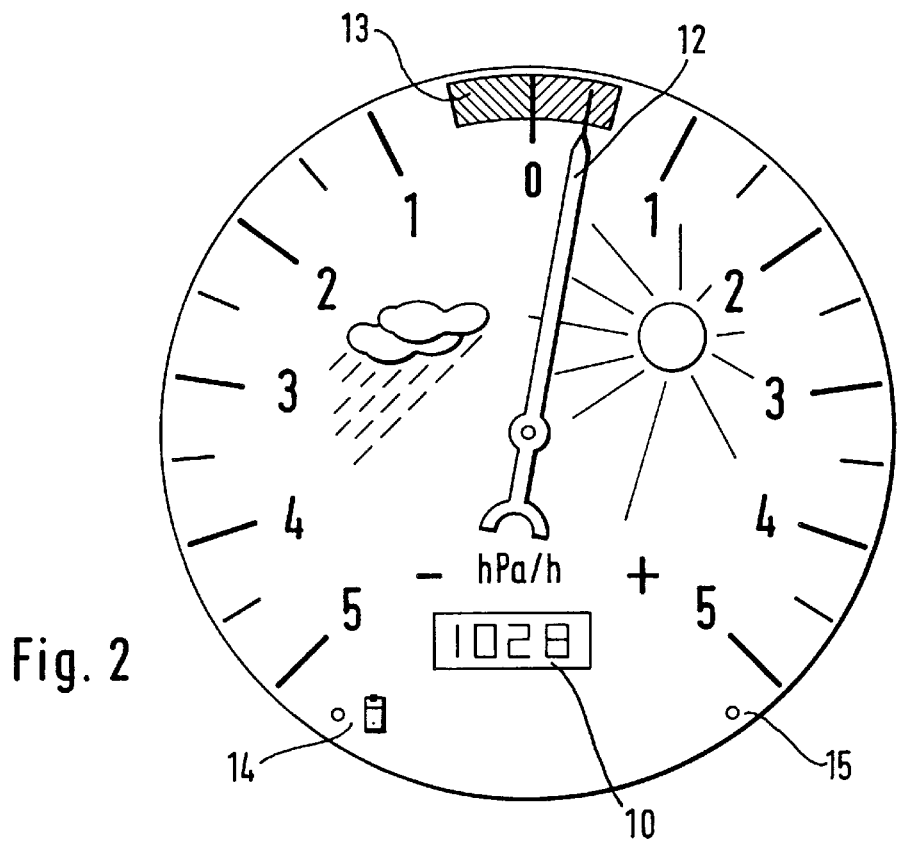
FIG. 2 is a first exemplary embodiment of a display dial for the device in accordance with FIG. 1.
Figure 3:
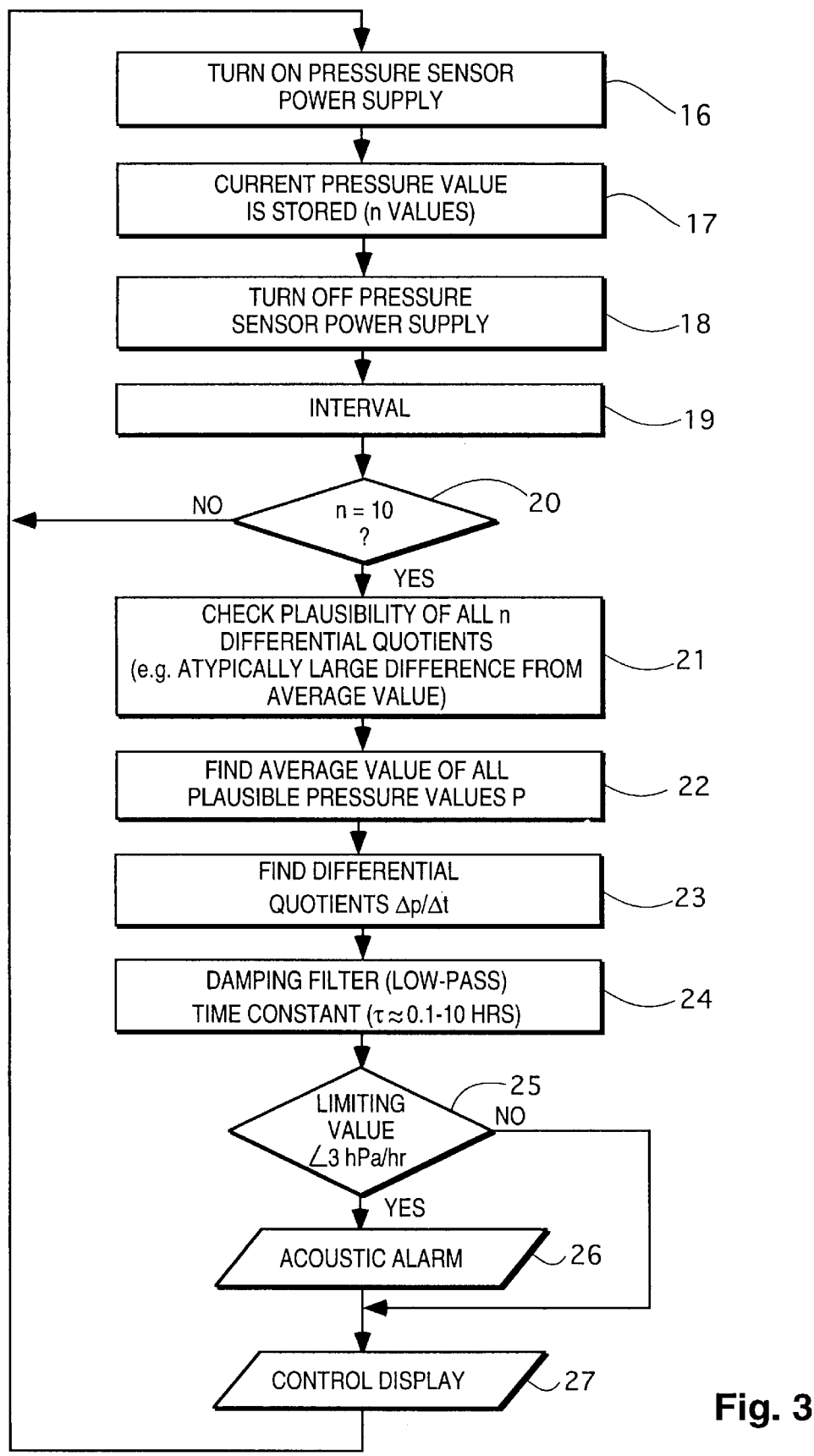
FIG. 3 is a flow chart for the device in accordance with FIG. 1.
Figure 4A:
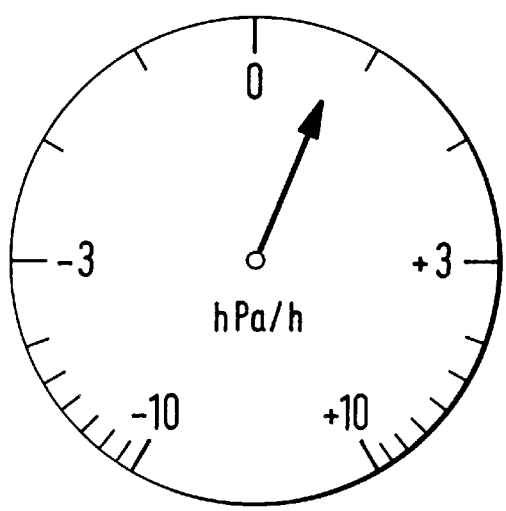
FIGS. 4a and 4b are a second and a third exemplary embodiment of a display dial for the device in accordance with FIG. 1.
Figure 4B:
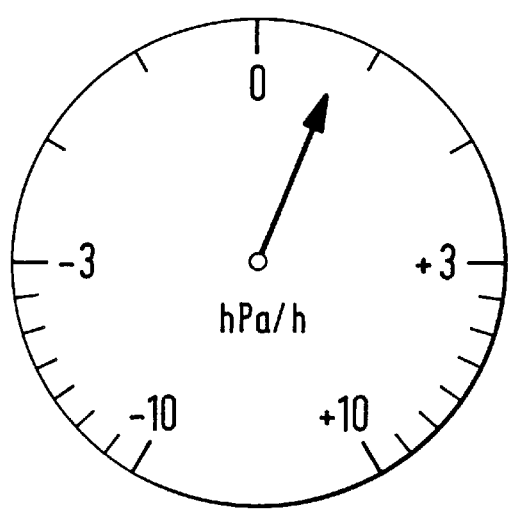
Figure 5:
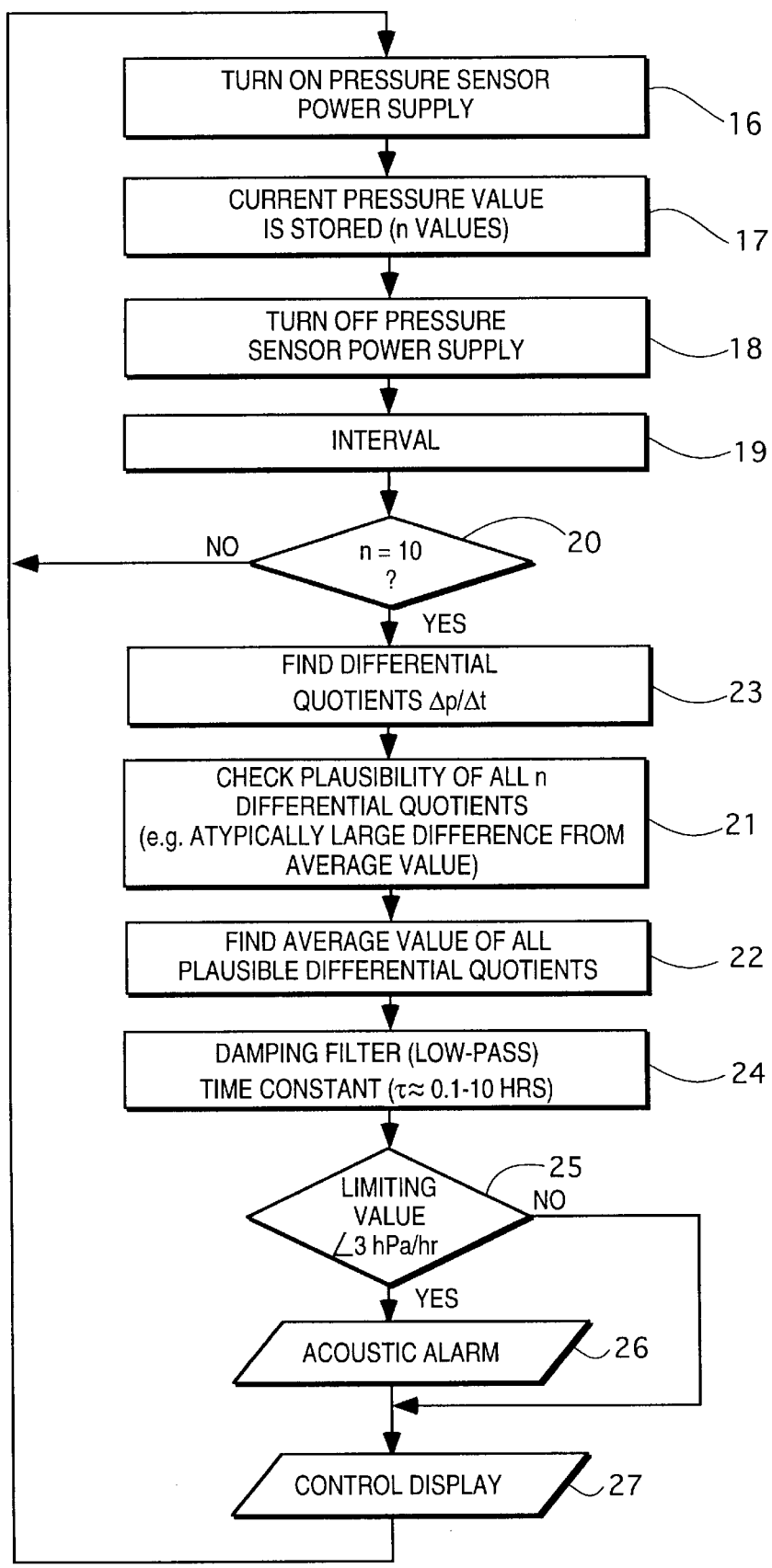
FIG. 5 is another exemplary embodiment of a flow chart for the device in accordance with FIG. 1.

The microcomputer 3 assumes the entire evaluation and control, which is explained in more detail in FIGS. 3 and 5. A step motor 7 has two phases and is actuated incrementally via two pulse signals 5 and 6. Each individual increment means a quarter or half rotation of the step motor shaft. The downstream gear 8 steps down the step angle in a desired precise angle resolution for an indicator drive. The output of the gear 8 is coupled directly to the indicator 12 in FIG. 2 or FIG. 4. A display 10 of the current absolute air pressure is connected to the microcomputer and is shown in FIG. 2 on the display dial. A hatch-marked area 13 on the scale of the display dial means no significant change in weather and stands out. An indicator stop 15 limits the maximum deflection of the indicator 12 during device start-up in that initially the step motor 7 drives the indicator 12 up to this stop 15 in order then to steer the indicator 12 incrementally to the actual display values from the reference point that constitutes the indicator stop 15.

Shortly before the supply voltage in a battery (not displayed) drops below the smallest permissible battery voltage for the device, the indicator 12 is moved to a position 14 for a clear display. This position 14 is marked with a battery symbol and is meant to indicate that the battery should be changed.

In another representation, the speed of the change in barometric pressure is indicated digitally, with mathematical sign and numerical figure, by a liquid crystal display 11 that is connected to the microcomputer 3. When the speed of change in barometric pressure drops below a fixed predetermined negative threshold, an acoustic alarm 9 is actuated by the microcomputer 3. This alarm represents a storm warning, e.g., if the threshold is between −2 hPa/h and −5 hPa/h.

The sequencing function in the microcomputer 3 is explained in more detail in the flow chart in FIG. 3. First, the electrical supply for the barometric pressure sensor 2 is turned on (16). After a current barometric pressure value has been stored (17), the supply is turned off again (18). After an interval (19) of, e.g., one minute, this measuring process is repeated, e.g., n=10 times, but at least 3 times. After this period, all n values are checked for plausibility (21). For instance, all of the barometric pressure values are not plausible that have an atypically large difference from an average value from a fixed, pre-determined series of measurements (e.g., n=10). Atypical means that a difference in measured value within a time window of a series of measurements (e.g., 10 minutes) is greater than maximum meteorological changes in barometric pressure. Such extreme changes in barometric pressure can be in a range below −10 hPa/h for hurricanes. Time interval and time window can be identical, but do not have to be.

Short-term pressure waves that can result from external but non-meteorological influences are much higher and are reliably filtered out by the plausibility check (21). Subsequent determination of the average value (22) delivers values that are even more reliable statistically and makes possible even higher resolution of the pressure values. The speed of change in barometric pressure is actually determined from the differential quotient $\Delta P/\Delta t$ (23).

The change in indicator is again effectively damped using a downstream low-pass filter 24 in that a time constant in the range of between $\tau \approx 0.1$ h to 10 h is selected. Digital low-pass filters can be solved usefully with the equation $$A(j\omega)=K/(1+j\omega\tau)$$

A threshold check (25) determines whether an acoustic alarm 26 should be output. Actuation of the step motor 7, an arrow symbol 28, or a digital display 11 is executed by digital steps.

The flow chart shown in FIG. 5 for the sequencing function of the microcomputer 3 is consistent in steps 16 through 20 and 24 through 27 to the sequencing function in FIG. 3. While in FIG. 3 following after step 20 the pressure values are checked for plausibility, then in step 22 the mean plausible pressure values are determined, and then in step 23 there is the differential quotient $\Delta P/\Delta t$, in FIG. 5 the individual differential quotients $\Delta P/\Delta t$ are found immediately after step 20. This step 23 is followed by a plausibility check of all differential quotients in a series of measurements n in which are filtered out the differential quotients that are caused by short-term pressure waves because of exterior, non-meteorological influences. In step 22, then, a mean value is determined from all plausible differential quotients.

The scale is graduated differently in the display dials illustrated in FIGS. 4a and 4b. The normal measurement range between −3 hPa/h and +3 hPa/h is displayed in FIG. 4b with greater linear graduation. The measurement range between +3 and +10, and the range between −3 and 10 hPa/h have reduced linear graduation, FIG. 4a showing a logarithmic graduation in the entire measurement range. In both cases the scales in the section for zero speed of change in barometric pressure are expanded compared to the end sections of the scales. This make it possible for even extremely rare, extremely high speed changes in air pressure, e.g., for hurricanes, not to lead to the indicating range stop while at the same time smaller speeds of change in barometric pressure can be read easily.

Figure 6:
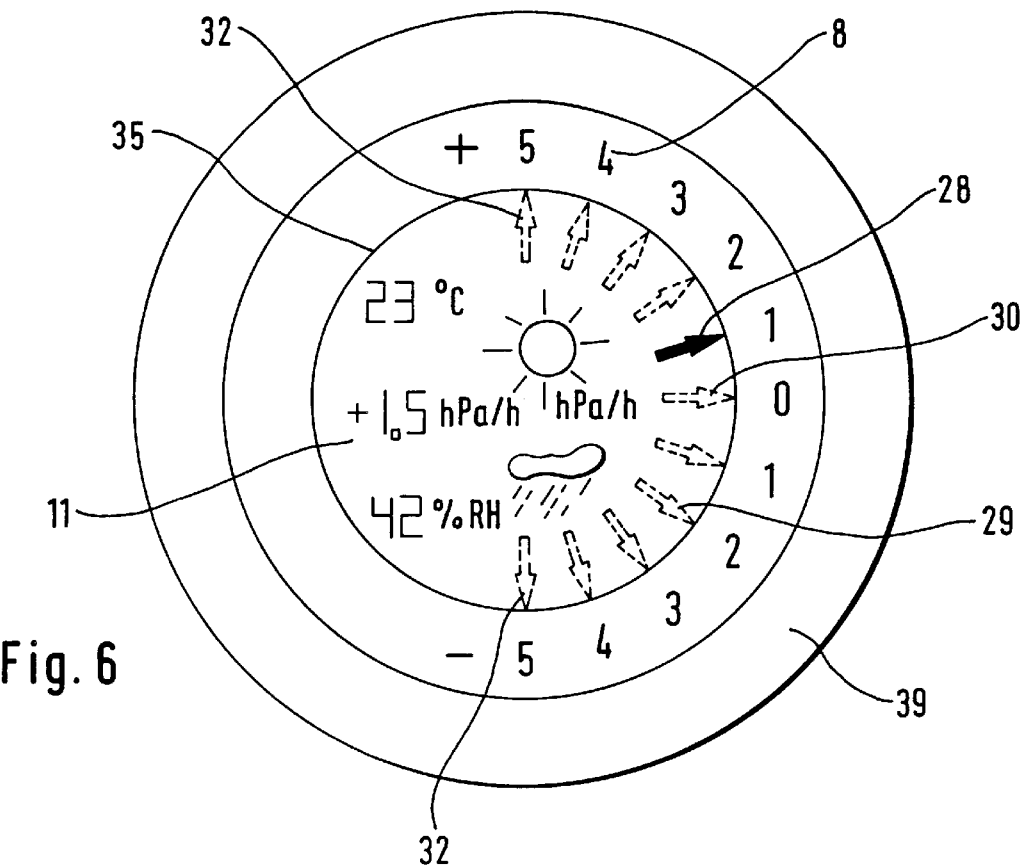
FIG. 6 is a device in accordance with FIG. 1 in which the display comprises a liquid crystal display.
Figure 7:
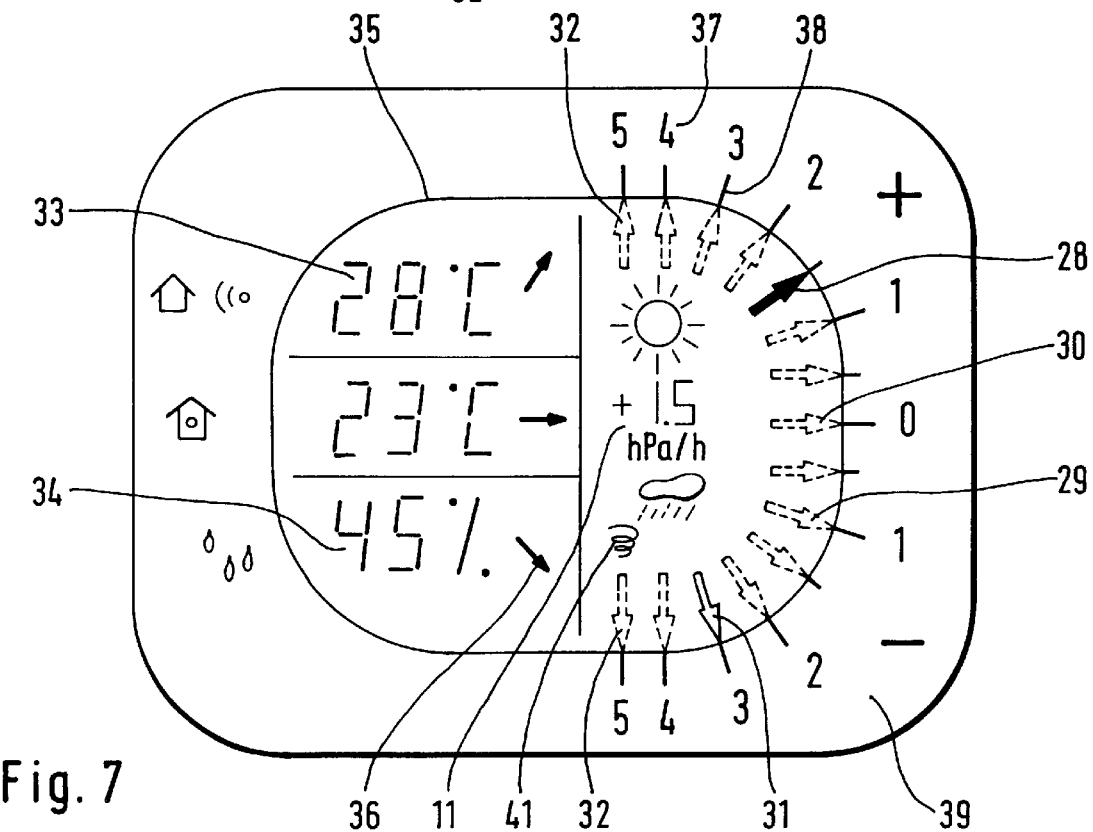
FIG. 7 is a device in accordance with FIG. 1 in which the display comprises a second exemplary embodiment of a liquid crystal display.
Figure 8:
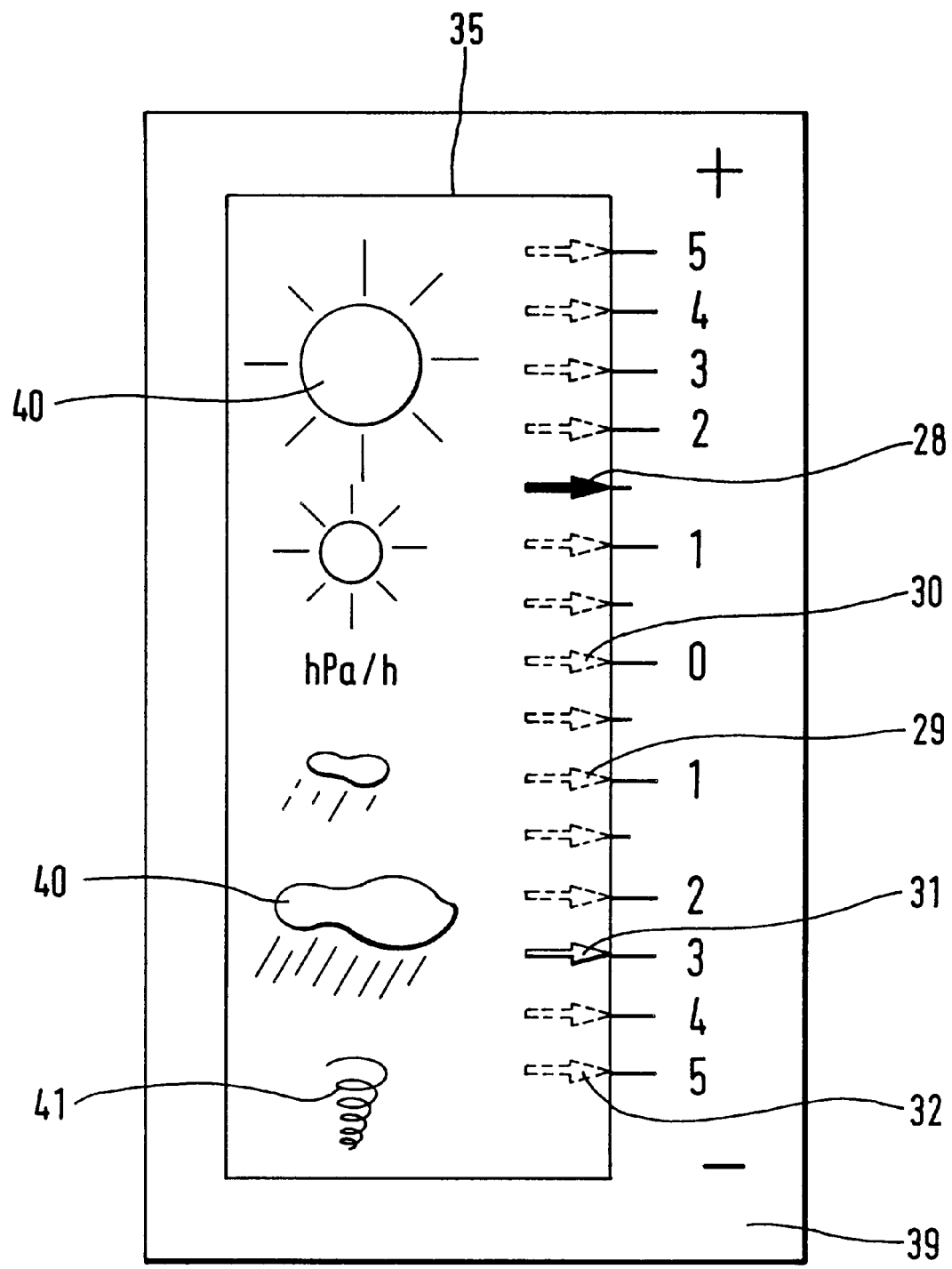
FIG. 8 is a device in accordance with FIG. 1 in which the display comprises a third exemplary embodiment of a liquid crystal display.

In the exemplary embodiments in FIGS. 6, 7, and 8, the displays are designed as liquid crystal displays and, rather than an indicator, comprise a number of graduated arrow symbols, each of which points to a value for a speed of change in barometric pressure. The speed of change in barometric pressure is given in hPa/h. Each arrow symbol 28, when actuated, indicates the current value. All unactuated arrow symbols 29, 30, and 32 are illustrated with dashed lines and are for illustrative purposes only. The unactuated arrow 30 is arranged horizontally for 0 change in air pressure and means that no substantial change is weather should be expected. The arrow 31 is in reality actuated weaker than the arrow 28 and indicates a manually adjustable limiting value for a storm warning. When this limiting value is achieved, this arrow symbol 31 is triggered to blink. An acoustic alarm can be actuated at the same time in the same rhythm.

The circular or oval arrow arrangement in FIGS. 6 and 7 results in a useful incline in the orientation of each individual arrow. The scale is also expanded in the oval arrangement of the symbols in FIG. 7. The vertically oriented arrows 32 in the semi-circular scale of the indicating range indicate the end of the indicating range and signal extreme changes in weather.

Using each of the right-hand halves of the display fields 35 in the dials in FIGS. 6 and 7 makes it possible to have additional displays for temperature 33 and relative humidity 34 on the left-hand side of the display field 35. The indicators for temperature 33 and humidity 34 can be supplemented when embodied as digital displays for forecasting trends by means of three controllable arrows 36 for increasing, steady, and falling values.

The digital display values for the speed of change in barometric pressure 11 can also be indicated in the display fields 35. It is provided that the figures 37 and the scale 38 are applied directly to the housing 39 of the device.

All of the arrows 28 through 32 in FIG. 8 have a horizontal orientation and indicate via the vertical arrangement of the scale increasing or falling changes in the weather. The neighboring sun and rain symbols 40 are arranged such that they are located at approximately the same height as the variables for changes in barometric pressure.

When changes in barometric pressure experience extreme drops below the threshold value for a storm warning, an indicator symbol 41 is triggered to blink. It is useful for the indicator symbol 41 to be designed as a hurricane symbol. A continuous acoustic tone can also be triggered.

The symbols used in the description mean the following:

$U_{Batt}$=Battery voltage (V)
$V_{VP}(t)$=Supply voltage for pressure sensor (V)
$U_S(t)$=Sensor output voltage (V)
$\tau$=Time constant (s)
$A_{(j\omega)}$=Filter output variable (hPa/h)
j=Imaginary unit
$\omega$=Angular frequency (1/s)
K=Filter input variable (hPa/h).

I claim:

1. Device for representing changes in air pressure comprising an electronic barometric pressure sensor and a digital differentiating circuit in which a differential quotient $\Delta P/\Delta t$ is found which is connected to a display of the speed of the change in barometric pressure with mathematical sign and numerical figure, characterized in that an electrical supply for said barometric pressure sensor (2) is obtained in cyclical intervals and in that the cyclically determined measured barometric pressure values are checked for plausibility, only the plausible measured barometric pressure values being used for the differential quotients $\Delta P/\Delta t$.

2. A device for representing changes in air pressure comprising an electronic barometric pressure sensor and a digital differentiating circuit in which a differential quotient $\Delta P/\Delta t$ is found which is connected to a display of the speed of the change in barometric pressure with mathematical sign and numerical figure, characterized in that the electrical supply for said barometric pressure sensor (2) is obtained in cyclical intervals, in that the differential quotients $\Delta P/\Delta t$ are found from the cyclically determined measured barometric pressure values, and the differential quotients $\Delta P/\Delta t$ are checked for plausibility, only the plausible differential quotients being used to actuate the display.

3. Device in accordance with claim 1, characterized in that at least three barometric pressure values are taken at a pre-determined interval and said values are stored temporarily in a memory.

4. Device in accordance with claim 1, characterized in that the plausibility is determined by atypically large deviations in individual barometric pressure measurements from an average value for barometric pressure measurements or atypically large deviations of individual differential quotients from an average value for the differential quotients formed from a time window specified in advance.

5. Device in accordance with claim 1 characterized in that the interval between the times at which the barometric pressure values are read is between approximately one and ten minutes.

6. Device in accordance with claim 1, characterized in that the interval between the times at which the barometric pressure values are read is between approximately 0.5 and 5 minutes.

7. Device in accordance with claim 1, characterized in that the current differential quotient $\Delta P/\Delta t$ or the average value of the current plausible differential quotients $\Delta P/\Delta t$ is forwarded to the display via a digital low-pass filter (24).

8. Device in accordance with claim 7, characterized in that the time constant of said digital low-pass filter (24) is between about 0.1 hour and ten hours.

9. Device in accordance with claim 1, characterized in that the display is a liquid crystal display (11).

10. Device in accordance with claim 9, characterized in that said liquid crystal display (11) can display at least five arrow symbols (28 through 32) that can be actuated independent of the determined change in pressure, the arrow symbols being arranged in a series, each arrow (28 through 32) being assigned a particular value of a change in barometric pressure and the orientation of said arrow symbol (30) for a 0 change in barometric pressure being approximately horizontal.

11. The device in accordance with claim 10, characterized in that the series of said arrow symbols (28 through 32) and a scale, are arranged in a somewhat circular shape.

12. The device in accordance with claim 10, characterized in that the series of said arrow symbols (28 through 32) and a scale (38), are arranged in a somewhat oval shape.

13. The device in accordance with claim 10, characterized in that the series of said arrow symbols (28 through 32) and the scale (38), if any, are arranged in a semi-circle.

14. Device in accordance with claim 1, characterized by non-linear scaling of the speed of the change in barometric pressure on a dial of said display.

15. Device in accordance with claim 1, characterized by scaling of the speed of the change in barometric pressure that is divided into different sections on a dial of said display.

16. The device in accordance with claim 1, characterized in that the scale in the section for 0 speed of change in barometric pressure is expanded compared to the end sections.

17. The device in accordance with claim 1, characterized in that the indicating range for speed of change in barometric pressure is essentially between −5 and +5 hPa/h.

18. Device in accordance with claim 1, characterized in that said barometric pressure sensor (2) is a capacitive barometric sensor.

19. Device in accordance with claim 1, characterized in that said barometric pressure sensor (2) is a piezo-resistive barometric sensor and comprises a doped semi-conductor.

20. Device in accordance with any of claims 1 through 8 and 13 through 18, characterized in that said display comprises an indicator (12) that is actuatable by a step motor (7).

21. Device in accordance with claim 20, characterized in that said indicator (12) is actuatable by said step motor (7) via a gear (8).

22. Device in accordance with claim 20, characterized in that said step motor (7) is a two-phase step motor having pulse drive for both directions of rotation.

23. Device in accordance with claim 1, characterized in that upon start-up said indicator (12) of said display is first steered to a defined reference point and then is guided to the display value by means of counting up and down incrementally.

24. Device in accordance with claim 23, characterized in that said defined reference point constitutes an indicator stop (15) of said indicator (12).

25. Device in accordance with claim 1, characterized in that said indicator (12), prior to dropping below the smallest permissible operating voltage, is guided to a warning position (14) outside the indicating range.

26. Device in accordance with claim 1, characterized in that an optical warning display is actuatable when the speed of change in barometric pressure drops below a pre-determined negative value.

27. Device in accordance with claim 1, characterized in that an acoustic alarm (9) is actuatable when the speed of the change in barometric pressure drops below a pre-determined negative threshold value.

28. Device in accordance with claim 1, characterized in that a display signal (41) is actuated to blink when the speed of change in barometric pressure drops below a limiting value for a storm warning.

29. Device in accordance with claim 1, characterized in that the absolute atmospheric pressure can be represented on the display (10) as an additional variable.

* * * * *